US012767011B2

(12) United States Patent
Kim et al.

(10) Patent No.: US 12,767,011 B2
(45) Date of Patent: Oct. 20, 2026

(54) SEAT CONTROL APPARATUS AND METHOD

(71) Applicants: HYUNDAI MOTOR COMPANY, Seoul (KR); KIA CORPORATION, Seoul (KR)

(72) Inventors: Ju Hyun Kim, Anyang-si (KR); Du Se Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/742,656

(22) Filed: Jun. 13, 2024

(65) Prior Publication Data

US 2025/0153614 A1 May 15, 2025

(30) Foreign Application Priority Data

Nov. 10, 2023 (KR) ........................ 10-2023-0155742

(51) Int. Cl.
*B60N 2/02* (2006.01)
*B60N 2/12* (2006.01)

(52) U.S. Cl.
CPC ....... *B60N 2/0276* (2013.01); *B60N 2/02246* (2023.08); *B60N 2/12* (2013.01)

(58) Field of Classification Search
None
See application file for complete search history.

(56) References Cited

U.S. PATENT DOCUMENTS

| | | | | |
|---|---|---|---|---|
| 11,623,545 | B2 * | 4/2023 | Lee | B60N 2/0278 701/36 |
| 2011/0043018 | A1 * | 2/2011 | Maeda | B60N 2/3065 297/340 |
| 2017/0158087 | A1 * | 6/2017 | Kwon | B60N 2/0244 |
| 2021/0129711 | A1 * | 5/2021 | Matha | B60N 2/12 |
| 2021/0309123 | A1 * | 10/2021 | Kang | B60N 2/14 |
| 2021/0309247 | A1 * | 10/2021 | Kim | B60N 2/0272 |
| 2022/0396178 | A1 * | 12/2022 | Sin | B60N 2/02246 |
| 2023/0339369 | A1 * | 10/2023 | Diamond | B60N 2/002 |

FOREIGN PATENT DOCUMENTS

| | | | | |
|---|---|---|---|---|
| CN | 118578942 A | * | 9/2024 | B60N 2/22 |

* cited by examiner

*Primary Examiner* — Abdulmajeed Aziz
(74) *Attorney, Agent, or Firm* — Lempia Summerfield Katz LLC

(57) ABSTRACT

A seat control apparatus includes an input device, a plurality of driving devices, a memory that stores one or more instructions, and a controller connected to the input device, the plurality of driving devices, and the memory. The controller is configured to identify current locations of the plurality of driving devices and target locations corresponding to a specified input, received through the input device, regarding a location control of a seat. The controller is also configured to predict whether an interference will occur while the plurality of driving devices are controlled from the current locations to the target locations. The controller is further configured to set operation sequences of the plurality of driving devices based on the prediction result and priorities of the plurality of driving devices. The controller is additionally configured to sequentially control the plurality of driving devices based on the operation sequences.

18 Claims, 8 Drawing Sheets

SEAT CONTROL APPARATUS AND METHOD

CROSS-REFERENCE TO RELATED APPLICATION

This application claims the benefit of and priority to Korean Patent Application No. 10-2023-0155742, filed in the Korean Intellectual Property Office on Nov. 10, 2023, the entire contents of which are incorporated herein by reference.

TECHNICAL FIELD

The present disclosure relates generally to a seat control apparatus and method. More particularly, the present disclosure relates to a technology for controlling interior components of a host vehicle including a plurality of driving devices.

BACKGROUND

As technology advances, various components in an interior of a vehicle may be operatively connected to each other. In particular, a seat control apparatus may quickly and accurately provide various functions by performing cooperative controls between components for convenience of users.

For example, a host vehicle may include seats that may be moved (e.g., sliding movement, movement of backrests, movement of leg rests, or folding) in a fully automatic manner with respect to a front side. This seat may be automatically moved to a specified location if a situation, such as a single user input (e.g., a switch input) and/or a specified event (e.g., a door opening or closing operation), is identified.

For example, in response to receiving a specified input (e.g., a touch input) from a user, the seat control apparatus may move a plurality of seats in the host vehicle to specified locations. As an example, the seat control apparatus may receive specific seat states from the user and store them in an integrated memory system (IMS). The seat control apparatus may then control at least some of the plurality of seats based on the stored state. The seat may be defined as a memory seat.

In some cases, in a process of moving driving devices corresponding to the seats in response to receiving a specified input from the user, interferences (or collisions) may occur between the seats. For example, when users seated in the host vehicle have changed the backrests of the seat from the standard locations or changed the slide locations, there is a possibility of an interference between the seats in the process of controlling the seats to the specified states.

SUMMARY

The present disclosure has been made to solve the above-mentioned problems occurring in the prior art while advantages achieved by the prior art are maintained intact.

According to aspects of the present disclosure, when a specified input regarding control of seats in a vehicle is received from a user, an interference possibility of the seats may be predicted, and operation sequences by which no interference will occur may be determined based on the result of the interference possibility prediction. Driving devices may then be sequentially controlled to move the seats based on the determined operation sequences.

Aspects of the present disclosure provide a seat control apparatus and method that may identify current locations (or current states) and target locations (or target states) of the driving devices. The seat control apparatus and method may then first determine an interference possibility of a driving device of which a movement amount (or a control degree), by which the driving device has to move from a current location to a target location, is largest.

Aspects of the present disclosure provide a seat control apparatus and method that may provide an alarm regarding an inability of control to a user and/or moves seats to standard locations when it is predicted that an interference of the seats will occur according to any possible sequence.

Aspects of the present disclosure provide an experience of an interior of a vehicle that enhances product value, convenience, and/or safety to the user, by moving seats (or driving devices) to standard locations, and in turn, determining an interference possibility and determining operation sequences to move the seats (or the driving devices) to specified states.

The technical problems to be solved by the present disclosure are not limited to the aforementioned problems. Other technical problems not mentioned herein should be readily understood from the following description by those having ordinary skill in the art to which the present disclosure pertains.

According to an aspect of the present disclosure, a seat control apparatus is provided. The seat control apparatus includes an input device, a plurality of driving devices, a memory that stores one or more instructions, and a controller operatively connected to the input device, the plurality of driving devices, and the memory. The instructions, when executed by the controller, cause the seat control apparatus to identify current locations of the plurality of driving devices and target locations corresponding to a specified input regarding a location control of a seat in response to receiving the specified input through the input device. The instructions, when executed by the controller, also cause the seat control apparatus to predict whether an interference will occur while the plurality of driving devices are controlled from the current locations to the target locations. The instructions, when executed by the controller, further cause the seat control apparatus set operation sequences of the plurality of driving devices based on i) a result of the prediction whether the interference will occur while the plurality of driving devices are controlled from the current locations to the target locations and ii) priorities of the plurality of driving devices. The instructions, when executed by the controller, additionally cause the seat control apparatus to sequentially control the plurality of driving devices based on the operation sequences.

According to an embodiment, the instructions, when executed by the controller, may further cause the seat control apparatus to set a higher priority to, a driving device, among the plurality of driving devices, of which a control degree required for moving the seat from a current location to a target location is higher.

According to an embodiment, the instructions, when executed by the controller, may cause the seat control apparatus to determine an interference possibility of a second driving device corresponding to a next priority to a first driving device in response to predicting that the first driving device will interfere with another driving device, among the plurality of driving devices, while the first driving device is moved from a first current location to a first target location. The instructions, when executed by the controller, may additionally cause the seat control apparatus to set the operation sequences to control the second driving device to a first priority in response to predicting that the second driving device will not interfere with any other driving device, among the plurality of driving devices, while the second driving device is moved from a second current location to a second target location.

According to an embodiment, the instructions, when executed by the controller, may cause the seat control apparatus to set the operation sequences to control a first driving device to a first priority in response to predicting that the first driving device will not interfere with any other driving device, among the plurality of driving devices, while the first driving device is moved from a first current location to a first target location. The instructions, when executed by the controller, may additionally cause the seat control apparatus to determine an interference possibility of a third driving device corresponding to a next priority to a second driving device in response to predicting that the second driving device will interfere with another driving device, among the plurality of driving devices, while the second driving device is moved from a second current location to a second target location.

According to an embodiment, the instructions, when executed by the controller, may cause the seat control apparatus to set the operation sequences to control the third driving device to a second priority in response to predicting that the third driving device will not interfere with any other driving device, among the plurality of driving devices, while the third driving device is moved from a third current location to a third target location. The instructions, when executed by the controller, may additionally cause the seat control apparatus to set the operation sequences to control the second driving device to a third priority in response to predicting that the second driving device will not interfere with any other driving device, among the plurality of driving devices, while the second driving device is moved from the second current location to the second target location after the first driving device and the third driving device are moved, respectively, to the first target location and the third target location. The instructions, when executed by the controller, may also cause the seat control apparatus to sequentially move the first driving device, the third driving device, and the second driving device to, respectively, the first target location, the third target location, and the second target location, based on the set operation sequences.

According to an embodiment, the instructions, when executed by the controller, may cause the seat control apparatus to predict whether an interference will occur while the plurality of driving devices are controlled from updated current locations to the target locations after the plurality of driving devices are moved to predefined standard locations when the operation sequences are not set. The instructions, when executed by the controller, may additionally cause the seat control apparatus to sequentially control the plurality of driving devices in the operation sequences based on i) a result of the prediction whether the interference will occur while the plurality of driving devices are controlled from updated current locations to the target locations and ii) the priorities.

According to an embodiment, the instructions, when executed by the controller, may cause the seat control apparatus to predict whether an interference will occur while a first driving device, among the plurality of driving devices, is controlled from a predefined first standard location to a first target location after the first driving device is moved to the first standard location when the operation sequences are not set. The instructions, when executed by the controller, may additionally cause the seat control apparatus to set the operation sequences based on i) a result of the prediction whether the interference will occur while the first driving device is controlled from the predefined first standard location to the first target location and ii) the priorities.

According to an embodiment, the instructions, when executed by the controller, may cause the seat control apparatus to move a driving device, among the plurality of driving devices, corresponding to a seat disposed on a front side with respect to a direction in which a host vehicle faces to the predefined first standard location first when the operation sequences are not set.

According to an embodiment, the seat control apparatus may further include an output device. The instructions, when executed by the controller, may further cause the seat control apparatus to stop operations of the plurality of driving devices when the operation sequences are not set. The instructions, when executed by the controller, may also cause the seat control apparatus to provide notification information including at least one of interference possibilities of the plurality of driving devices, control disable state guides, guides regarding the current locations and the target locations, or any combination thereof, to a user through the output device.

According to an embodiment, the plurality of driving devices may include a first driving device corresponding to a first seat among a plurality of seats disposed in a host vehicle. The first driving device may include at least one of a tilting motor that adjusts a tilting angle of the first seat, a reclining motor that adjusts a backrest angle of the first seat, a leg rest motor that adjusts a leg rest angle of the first seat, a slide motor that adjusts a slide location of the first seat, or any combination thereof.

According to another aspect of the present disclosure, a seat control method is provided. The seat control method includes identifying, by a controller, current locations of a plurality of driving devices and target locations corresponding to a specified input regarding a location control of a seat if receiving the specified input through an input device. The seat control method also includes predicting, by the controller, whether an interference will occur while the plurality of driving devices are controlled from the current locations to the target locations. The seat control method further includes setting, by the controller, operation sequences of the plurality of driving devices based on i) a result of the prediction whether an interference will occur while the plurality of driving devices are controlled from the current locations to the target locations and ii) priorities of the plurality of driving devices. The seat control method additionally includes sequentially controlling, by the controller, the plurality of driving devices based on the operation sequences.

According to an embodiment, the seat control method may further include setting, by the controller, a higher priority to, among the plurality of driving devices, a driving device, of which a control degree required for moving the driving device from a current location to a target location is higher.

According to an embodiment, the seat control method may further include determining, by the controller, an interference possibility of a second driving device corresponding to a next priority to a first driving device in response to predicting that the first driving device will interfere with another driving device, among the plurality of driving devices, while the first driving device is moved from a first current location to a first target location. The seat control method may also include setting, by the controller, the operation sequences to control the second driving device to a first priority in response to predicting that the second driving device will not interfere with the any other driving device, among the plurality of other driving devices, while the second driving device is moved from a second current location to a second target location.

According to an embodiment, the seat control method may further include setting, by the controller, the operation sequences to control the first driving device to a first priority in response to predicting that the first driving device will not interfere with any other driving device, among the plurality of driving devices, while the first driving device is moved from a first current location to a first target location. The seat control method may also include determining, by the controller, an interference possibility of a third driving device corresponding to a next priority to a second driving device in response to predicting that the second driving device will interfere with another driving device, among the plurality of driving devices, while the second driving device is moved from a second current location to a second target location.

According to an embodiment, the seat control method may further include setting, by the controller, the operation sequences to control the third driving device to a second priority in response to predicting that the third driving device will not interfere with any other driving device, among the plurality of driving devices, while the third driving device is moved from a third current location to a third target location. The seat control method may also include setting, by the controller, the operation sequences to control the second driving device to a third priority in response to predicting that the second driving device will not interfere with any other driving device, among the plurality of driving devices, while the second driving device is moved from the second current location to the second target location after the first driving device and the third driving device are moved, respectively, to the first target location and the third target location. The seat control method may also include sequentially moving the first driving device, the third driving device, and the second driving device to, respectively, the first target location, the third target location, and the second target location, based on the set operation sequences.

According to an embodiment, the seat control method may further include predicting, by the controller, whether an interference occurs while the plurality of driving devices are controlled from updated current locations to the target locations after the plurality of driving devices are moved to predefined standard locations when the operation sequences are not set. The seat control method may also include sequentially controlling, by the controller, the plurality of driving devices in the determined operation sequences based on i) a result of the prediction whether an interference will occur while the plurality of driving devices are controlled from updated current locations to the target locations and ii) the priorities.

According to an embodiment, the seat a method may include predicting, by the controller, whether the interference occurs while a first driving device, among the plurality of driving devices, is controlled from a predefined first standard location to a first target location after the first driving device is moved to the first standard location when the operation sequences are not set. The seat control method may also include setting, by the controller, the operation sequences based on i) a result of the prediction whether the interference will occur while the first driving device is controlled from the predefined first standard location to the first target location and ii) the priorities.

According to an embodiment, the seat control method may further include moving, by the controller, a driving device, among the plurality of driving devices, corresponding to a seat disposed on a front side with respect to a direction in which a host vehicle faces to the predefined first standard location first when the operation sequences are not set.

According to an embodiment, the seat control method may further include stopping, by the controller, operations of the plurality of driving devices when the operation sequences are not set. The seat control method may also include providing, by the controller, notification information including at least one of interference possibilities, control disable state guides, guides regarding the current locations and the target locations, or any combination thereof, to a user through an output device.

According to an embodiment, the plurality of driving devices may include a first driving device corresponding to a first seat among a plurality of seats disposed in a host vehicle. The first driving device may include at least one of a tilting motor that adjusts a tilting angle of the first seat, a reclining motor that adjusts a backrest angle of the first seat, a leg rest motor that adjusts a leg rest angle of the first seat, a slide motor that adjusts a slide location of the first seat, or any combination thereof.

BRIEF DESCRIPTION OF THE DRAWINGS

The above and other objects, features, and advantages of the present disclosure should be more apparent from the following detailed description taken in conjunction with the accompanying drawings, in which.

In relation to the description of the drawings, the same or similar reference numerals may denote the same or similar components.

DETAILED DESCRIPTION

Figure 1:
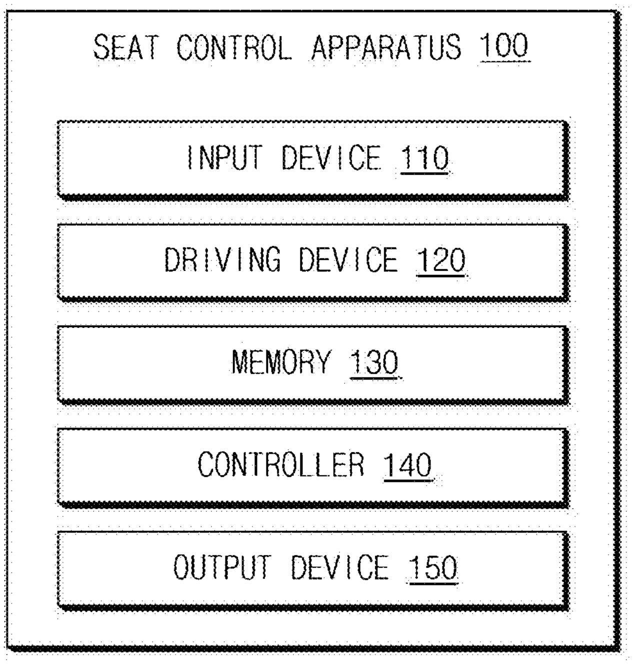
FIG. 1 is a block diagram illustrating components of a seat control apparatus, according to an embodiment of the present disclosure.

Hereinafter, embodiments of the present disclosure are described in detail with reference to the accompanying drawings. In adding the reference numerals to the components of each drawing, identical or equivalent components are designated by the identical numeral even when the components are displayed on different drawings. Further, in describing the embodiment of the present disclosure, where it was determined that a detailed description of well-known features or functions may unnecessarily obscure the gist of the present disclosure, a detailed description thereof has been omitted.

In describing the components of the embodiment according to the present disclosure, terms such as first, second, "A", "B", (a), (b), and the like may be used. These terms are merely intended to distinguish one component from another component. The terms do not limit the nature, sequence, or order of the constituent components. Unless otherwise defined, all terms used herein, including technical or scientific terms, have the same meanings as those generally understood by those having ordinary skill in the art to which the present disclosure pertains. Such terms as those defined in a generally used dictionary should be interpreted as having a meaning that is consistent with the contextual meanings in the relevant field of art. The terms should not be interpreted as having ideal or excessively formal meaning unless clearly defined as having such in the present application.

When a component, device, element, or the like of the present disclosure is described as having a purpose or performing an operation, function, or the like, the component, device, or element should be considered herein as being "configured to" meet that purpose or perform that operation or function.

Hereinafter, embodiments of the present disclosure are described in detail with reference to FIGS. 1-6.

FIG. 1 is a block diagram illustrating components of a seat control apparatus, according to an embodiment of the present disclosure.

According to an embodiment, a seat control apparatus 100 may include at least one of an input device 110, a driving device 120, a memory 130, a controller 140, or any combination thereof. The configuration of the seat control apparatus 100 illustrated in FIG. 1 is illustrative. Embodiments of the present disclosure are not limited thereto. For example, the seat control apparatus 100 may further include one or more components that are not illustrated in FIG. 1, such as at least one of an input device, an interface, a communication device, or a notification device, or any combination thereof.

According to an embodiment, the input device 110 may include at least one input device that receives a user input regarding components of the host vehicle.

For example, the input device 110 may include at least one of at least one switch, a touchscreen, a voice acquisition device, or any combination thereof.

In an example, the input device 110 may be disposed in an area of at least one seat, a center fascia, a back of a seat, and/or an area of the trunk.

The input device 110 may receive a location control input for at least some of a plurality of seats in a host vehicle from a user.

In an example, when receiving a pressure input to a switch, a touch input to a touchscreen, and/or a voice input to a voice acquisition device from the user, the seat control apparatus 100 may perform a seat location control corresponding to the input.

As an example, the seat control apparatus 100 may receive a specified input regarding a seat location control from the user through the input device 110. The specified input, for example, may include a user input that requests control of a location of the seat in a predefined state.

According to an embodiment, the driving device 120 may include various driving devices that adjust the location (or the state) of the seat.

For example, the driving device 120 may mean the seat itself. In other words, the driving device 120 may include a dynamic system of the seat itself, that may adjust at least one of a reclining angle (or a backrest angle), a slide location, a headrest angle, a leg rest angle, a swivel angle, or any combination thereof.

In an example, the driving device 120 may include a first driving device corresponding to a first seat among the plurality of seats disposed in the host vehicle. The first driving device, for example, may include a tilting motor that adjusts a tilting angle of the seat, a reclining motor that adjusts a backrest angle of the first seat, a leg rest motor that adjusts a leg rest angle of the first seat, a slide motor that controls a slide location of the seat, or any combination thereof.

The controller 140 may perform a slide control for moving the seat forward and rearward or a swivel control for rotating the seat at a specified angle within 360 degrees with respect to a vertical axis, by using the driving device 120.

In an example, the driving device 120 may include a plurality of driving devices corresponding to a plurality of seats, respectively. As an example, the driving device 120 may include a first driving device corresponding to the driver's seat, a second driving device corresponding to the front-row seat next to the driver's seat, a third driving device corresponding to a left rear seat, and/or a fourth driving device corresponding to a right rear seat.

According to an embodiment, the memory 130 may store commands or data. For example, the memory 130 may store one or more instructions that, when executed by the controller 140, cause the seat control apparatus 100 to perform various operations.

In an example, the memory 130 may be implemented as one chipset with the controller 140. The controller 140 may include at least one of a communication processor or a modem.

In an embodiment, the memory 130 may store a specified seat location (or a seat state). In an example, the memory 130 may store information on locations (or states) of the plurality of seats. which are set by the user. In an example, the memory 130 may store a state (e.g., a rotation direction, an rpm, a pulse) of the driving device 120 corresponding to the specified seat location.

According to an embodiment, the controller 140 may be operatively connected to at least one of the input device 110, the driving device 120, the memory 130, or any combination thereof. For example, the controller 140 may control an operation of at least one of the input device 110, the driving device 120, the memory 130, or any combination thereof.

For example, when receiving a specified input regarding a seat location control through the input device 110, the controller 140 may identify current locations (or current states) of the driving devices 120 and a target location (or a target state) corresponding to the specified input.

As an example, the controller 140 may identify the target location corresponding to the specified input from information stored in the memory 130. The target locations, for example, may include locations (or states) of the plurality of seats, that are preset by the user. The target locations, for example, may include information on at least one of the backrest angles, the tilting angles, the leg rest angles, the cushion angles, the slide locations of the seats, or any combination thereof.

The current locations may be the locations (or the states) of the plurality of seats (or the plurality of driving devices), that are identified in real time. The current locations, for example, may include information on at least one of the backrest angles, the tilting angles, the leg rest angles, the cushion angles, the slide locations of the seats, or any combination thereof. For example, the controller 140 may identify the current locations of the seat through at least one sensor (e.g., a Hall sensor).

The controller 140 may predict whether an interference will occur while controlling the driving device 120 from the current location to the target location.

For example, the controller 140 may identify whether there is a possibility of the seat corresponding to the driving device 120 interfering with another seat while the driving device 120 is moved from the current location to the target location before the driving device 120 is driven.

In an example, the controller 140 may map the location information corresponding to each of the current location and the target location of the driving device 120 to a predefined table to identify whether there is a possibility of the seat corresponding to the driving device 120 interfering with other seats.

As an example, the controller 140 may identify location information for each of at least one driving device (e.g., a motor) included in the driving device 120, and may map a coordinate value that represents a combination of the identified location information to a predefined table to identify whether there is a possibility of the seat corresponding to the driving device 120 interfering with other seats.

For example, when there is a time point at which a minimum spacing distance between the seat corresponding to the driving device 120 and another seat is less than or equal to a specified value (e.g. 60 mm) while the seat is controlled from the current location to the target location, the controller 140 may determine that there is a possibility of an interference of the seat.

The controller 140 may set operation sequences based on an interference prediction result and the priorities of the plurality of driving devices including the driving device 120.

As an example, the controller 140 may set the priorities for the driving devices 120 based on a specified standard. For example, the controller 140 may set a higher priority to, among the plurality of driving devices, the driving device 120 that has a higher control degree (or a larger pulse or a larger movement amount) that is required for moving the driving device from the current location to the target location. In other words, the controller 140 may set the priorities to the driving devices in the order of the magnitudes of the control degrees (e.g., control time periods and/or torques for driving) required for moving the driving devices from the current locations to the target locations.

As an example, the controller 140 may identify a first current location, a second current location, and/or a third location that are the current locations of, among the driving devices 120, the first driving device, the second driving device, and/or the third driving device based on information acquired through the sensor (e.g., the Hall sensor). The first driving device, the second driving device, and the third driving device may be driving devices for location controls (or state controls) of the first seat, a second seat, and a third seat, respectively.

For example, the controller 140 may identify, among the target locations corresponding to the specified input, a first target location, a second target location, and/or a third target location of the first driving device, the second driving device, and/or the third driving device based on the information stored in the memory 130.

As an example, the controller 140 may identify required control degrees of the first driving device, second driving device, and third driving device. In the following, the operation of the controller 140 may be described with an assumption that the priorities are set such that the first driving device has a first priority, the second driving device has a second priority, and the third driving device has a third priority.

In an example, if it is predicted that the first driving device will interfere with driving devices (or seats corresponding to other driving devices) other than the first driving device (or a first seat corresponding to the first driving device) while the first driving device is moved from the first current location to the first target location, it may be determined that there is a possibility of an interference of the second driving device corresponding to the next priority to that of the first driving device. Then, if it is predicted that, among the plurality of driving devices, the second driving device will not interfere with the other driving devices while being moved from the second current location to the second target location, the operation sequences may be set such that the second driving device is controlled to have the first priority. In other words, the operation sequences may be set to control the second driving device earlier than the first driving device because it is predicted that the seat corresponding to the first driving device, the priority of which is the first priority, will interfere with another seat during movement thereof, the interference possibility of the second driving device corresponding to the next priority is predicted, and no interference is predicted.

On the other hand, if it is predicted that the first driving device will not interfere with any other driving device than, among the plurality of driving devices, the first driving device while moving from the first current location to the first target location, the operation sequences may be set to control the first driving device to the first priority. In other words, this may be a case in which it is predicted that the first driving device (or the first seat corresponding to the first driving device) will not interfere with another driving device (or another seat corresponding to another driving device). In this case, because it is predicted that the first driving device, the priority of which is the first priority, will not interfere with another driving device while the first driving device is moved from the first current location to the first target location, it may be defined as a case in which the operation sequence thereof also is set to the first priority.

Thereafter, if predicting that the second driving device will interfere with a driving device other than, among the plurality of driving devices, the second driving device while being moved from the second current location to the second target location, the controller may determine a possibility of an interference of the third driving device corresponding to the next priority to that of the second driving device. In other words, the controller 140 may set the operation sequence of the first driving device to the first priority, and then may predict the possibility of an interference of the second driving device, the priority of which is the next priority to that of the first driving device. The predicted interference possibility of the second driving device may be an interference possibility that may occur while the second driving device is moved from the second current location to the second target location in a situation in which the first driving device has been moved to the first target location.

Then, if it is predicted that the second driving device will interfere with another driving device, setting of the operation sequence of the second driving device may be suspended and the interference possibility of the third driving device, the priority of which is next to that of the second driving device, may be determined. In other words, the controller 140 may set the operation sequences such that the third driving device is controlled to have the second priority if it is predicted that the third driving device (or the third driving seat corresponding to the third driving device) will not interfere with a driving device (or a seat corresponding thereto) other than the third driving device (or the third seat corresponding to the third driving device) while being moved from the third current location to the third target location. In other words, if it is predicted that the third driving device will not interfere with the other driving devices while being moved from the third current location to the third target location, the controller 140 may set the operation sequence of the third driving device to the second priority that is the next priority to that of the first driving device.

Thereafter, the controller 140 may predict the possibility of an interference of the second driving device again. Then, the predicted interference possibility of the second driving device may be an interference possibility that may occur while the second driving device is moved from the second current location to the second target location in a situation in which the first driving device has been moved to the first target location and the third driving device has been moved to the third target location. If it is predicted that there is no interference possibility of the second driving device, the operation sequences may be set such that the second driving device is controlled to have the third priority. The controller 140 may set the operation sequences in the order of the first driving device, the third driving device, and the second driving device, and may complete setting of the operation sequences. The controller 140 may sequentially move the first driving device, the third driving device, and the second driving device to the first target location, the third target location, and the second target location, respectively, based on the set operation sequences.

In an example, when the operation sequences are not set, the controller 140 may move the plurality of driving devices to a predefined standard location, and then may predict whether there will be an interference while performing a control from the updated current locations to the target locations. The controller 140, for example, may determine that the setting of the operation sequences has not been completed when identifying that all the driving devices have an interference possibility or that an interference possibility of one driving device does not disappear in a prediction result of the interference possibility based on the priorities of the first to third driving devices. In this case, the controller 140 may move the plurality of driving devices to predefined standard locations. Then, the controller 140 may collectively move the plurality of driving devices to the standard locations, and may move, among the plurality of driving devices, a specific driving device (e.g., the first driving device) determined based on the specified sequences (e.g., predefined sequences, sequences of the seats that are located on a front side in a direction which the host vehicle faces, or sequences of the seats that are located on a rear side thereof) to the predefined standard locations (e.g., the first standard location).

In an example, when the first driving device is moved first, it may be predicted whether the plurality of driving devices will interfere if the movement of the first driving device is completed, and if the setting of the operation sequences are not completed, another driving device (e.g., the second driving device) may be moved to the predefined standard location (e.g., the second standard location). Furthermore, when the movement of the second driving device is completed, the controller 140 may set the operation sequences by predicting whether each of the plurality of driving devices will interfere. Thereafter, the controller 140 may repeatedly perform operations of predicting interference possibilities of the plurality of driving devices and setting the operation sequences. The controller 140 may sequentially control the plurality of driving devices to the target locations with the operation sequences determined based on the prediction result and the priorities.

In an example, if the operation sequences are not set, the controller 140 may stop controlling the driving device 120 and provide a notification to the user. The controller 140, for example, may provide the user with notification information including at least one of the interference possibility of the driving device, a control disable state guide, a guide regarding a current location and a target location, or any combination thereof, by using an output device 150. The controller 140 may provide notification information through visual contents and/or auditory contents.

According to an embodiment, the output device 150 may include at least one of a display device, an audio output device, a haptic device, or any combination thereof.

For example, the controller 140 may output notification information including any combination of one or more of a location, a state, an interference possibility, a control disable state guide, or a guide about a current location and a target location of the seat corresponding to the driving device 120, by using the output device 150.

Hereinafter, different implementation examples of the seat control apparatus, according to embodiments of the present disclosure, are described in more detail below in connection with FIGS. 2A-3B. The implementation example according to FIGS. 2A and 2B and the implementation example according to FIGS. 3A and 3B are different implementation examples of the seat control apparatus. However, these implementation schemes are merely illustrative, and embodiments of the present disclosure are not limited thereto.

Figure 2A:
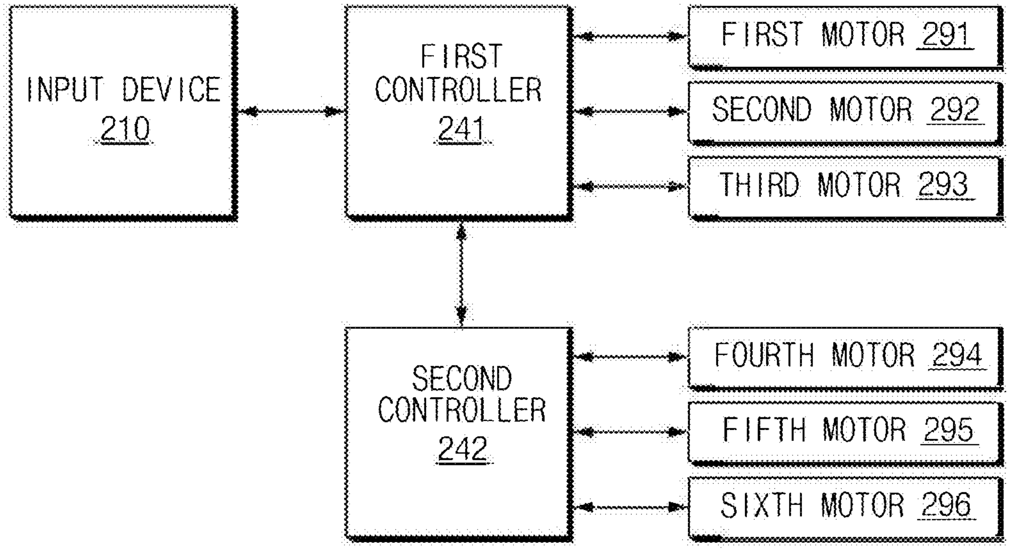
FIGS. 2A and 2B are block diagrams illustrating components of a seat control apparatus, according to an embodiment of the present disclosure.
Figure 2B:
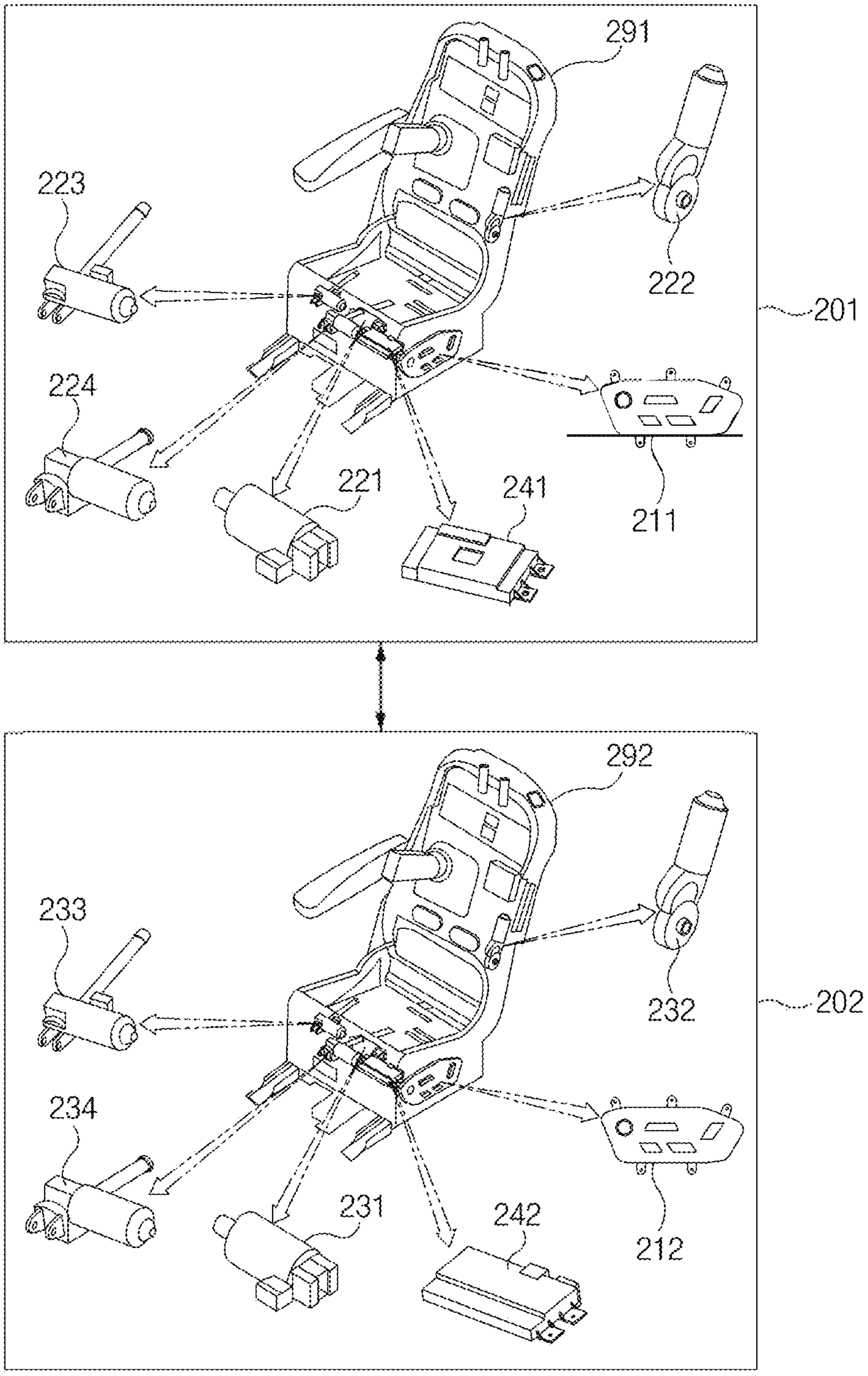
Figure 3A:
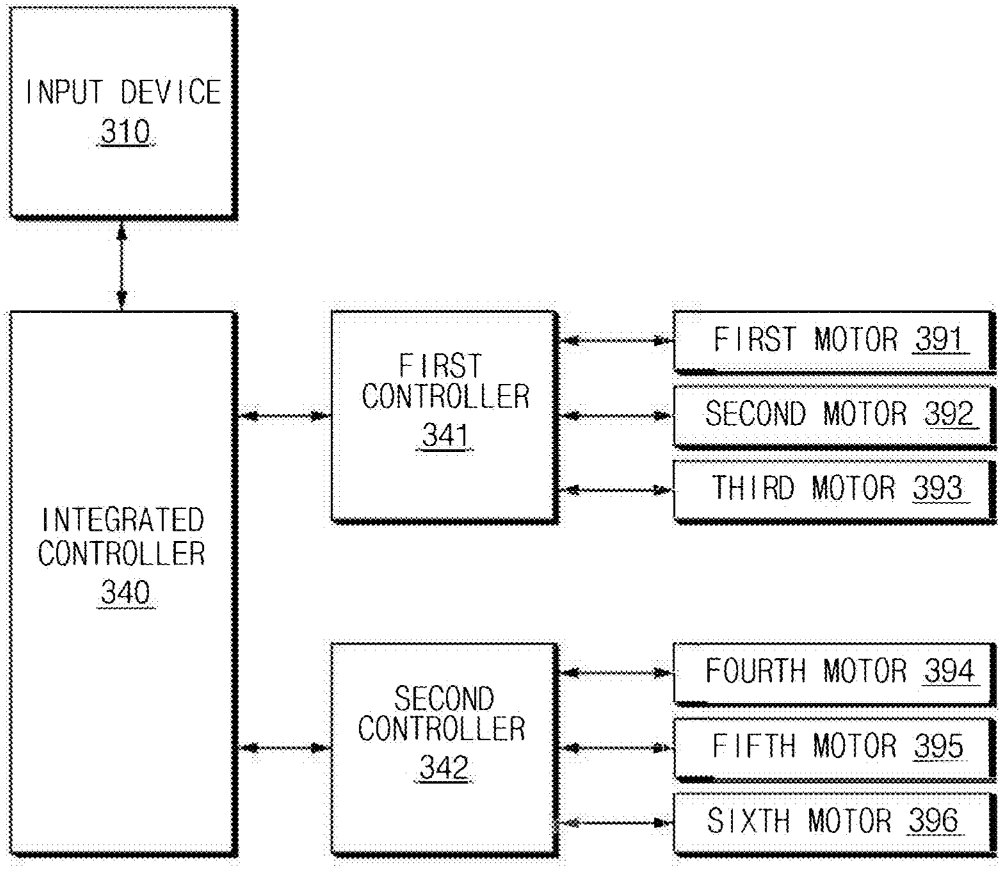
FIGS. 3A and 3B are block diagrams illustrating components of a seat control apparatus, according to another embodiment of the present disclosure.
Figure 3B:
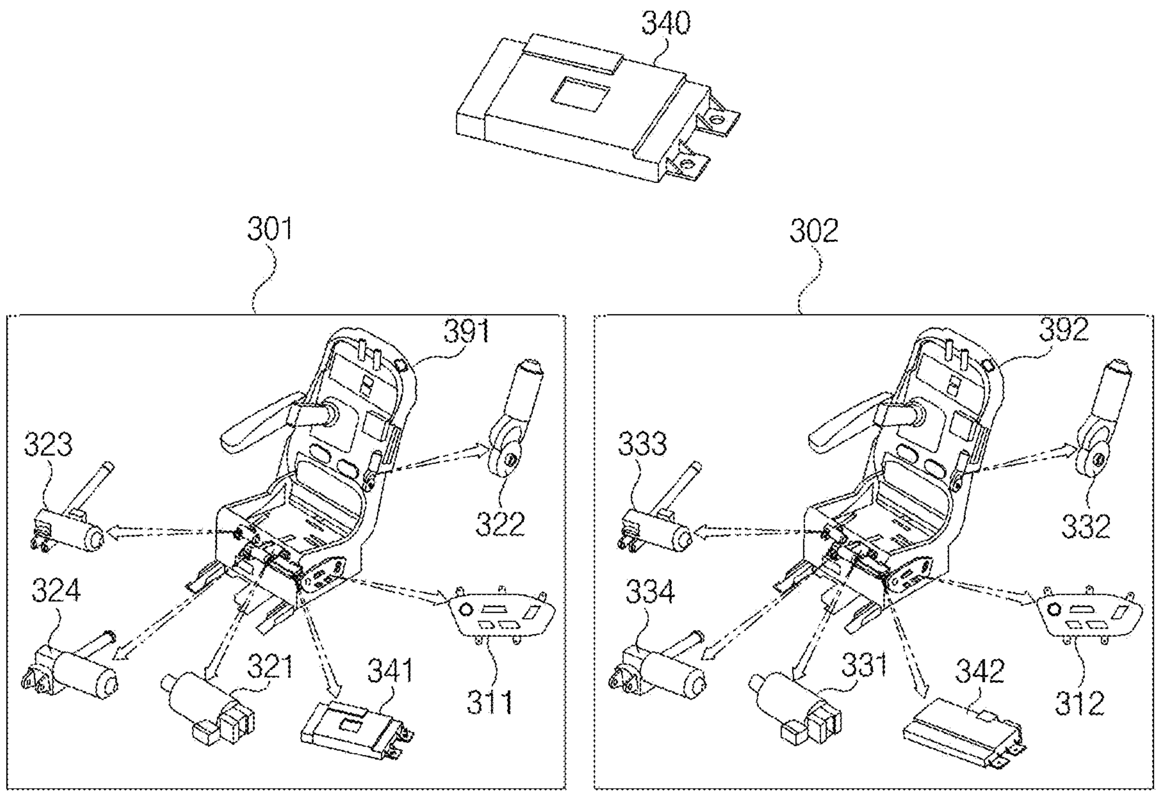

FIGS. 2A and 2B are block diagrams illustrating components of a seat control apparatus, according to an embodiment of the present disclosure.

According to an embodiment, the seat control apparatus (e.g., the seat control apparatus 100 of FIG. 1) may include at least one of an input device 210 (e.g., corresponding to the input device 110 of FIG. 1), a first controller 241, a second controller 242, a first motor 291, a second motor 292, a third motor 293, a fourth motor 294, a fifth motor 295, a sixth motor 296, or any combination thereof. The first to third motors 291 to 293 may be components that are included in the first driving device for controlling a location of the first seat. The fourth to sixth motors 294 to 296 may be components that are included in the second driving device for controlling a location of the second seat.

The first controller 241 may be electrically connected to the first motor 291, the second motor 292, and the third motor 293 provided to control the location of the first seat. The first controller 241 may be further electrically connected to the second controller 242 and the input device 210.

The first controller 241 may receive a specified input from the input device 210. The specified input may include a request to control movement of at least some of the plurality of seats to specified target locations.

For example, the first controller 241 may acquire location information (or state information of the motor acquired through a Hall sensor) from the first motor 291, the second motor 292, and the third motor 293, and may identify a current location of the first seat based on the acquired location information.

For example, the first controller 241 may identify a current location of the second seat from the second controller 242. The second controller 242 may acquire location information (or state information of the motor, which is acquired through a Hall sensor) from the fourth motor 294, the fifth motor 295, and the sixth motor 296, and may identify a current location of the second seat based on the acquired location information and then deliver the identified current location to the first controller 241.

In an example, the first controller 241 may predict the possibility of an interference occurring while controlling the seats from the current locations to the target locations, based on the acquired location information. Based on the prediction result, the first controller 241 may set operation sequences. The first controller 241 may provide a driving device control operation request signal to the other controllers, including the second controller 242, such that the location thereof is controlled based on the set operation sequences.

Referring to FIG. 2B, according to an embodiment, a first system 201 (or the first driving device) and a second system 202 (or the second driving device) may transmit and receive electrical signals to and from each other.

In an example, the first system 201 may include a first seat 291. The first system 201 may include at least one of at least one motor (e.g., a first slide motor 221, a first reclining motor 222, a first tilting motor 223, and/or a first leg rest motor 224) for controlling a location of the first seat 291, a first input device 211, the first controller 241, or any combination thereof.

The second system 202 may include a second seat 292. The second system 202 may include at least one of at least one motor (e.g., a second slide motor 231, a second reclining motor 232, a second tilting motor 233, and/or a second leg rest motor 234) for controlling a location of the second seat 292, a second input device 212, or the second controller 242, or any combination thereof.

FIGS. 3A and 3B are block diagrams illustrating components of a seat control apparatus, according to another embodiment of the present disclosure.

According to an embodiment, the seat control apparatus (e.g., the seat control apparatus 100 of FIG. 1) may include at least one of an input device 310 (e.g., corresponding the input device 110 of FIG. 1), a first controller 341, a second controller 342, a first motor 391, a second motor 392, a third motor 393, a fourth motor 394, a fifth motor 395, a sixth motor 396, an integrated controller 340, or any combination thereof. The first to third motors 391 to 393 may be components that are included in the first driving device for controlling the location of the first seat. The fourth to sixth motors 394 to 396 may be components that are included in the second driving device for controlling the location of the second seat.

In an example, the first controller 341 may be electrically connected to the first motor 391, the second motor 392, and the third motor 393 that are provided to control the location of the first seat. Unlike the example of FIG. 2A, the first controller 341 may be further electrically connected to the integrated controller 340.

The second controller 342 may be electrically connected to the fourth motor 394, the fifth motor 395, and the sixth motor 396 that are provided to control the location of the second seat. Unlike the example of FIG. 2A, the second controller 342 may be further electrically connected to the integrated controller 340.

The integrated controller 340 may receive a specified input through the input device 310. The specified input may include a request to control movement of at least some of the plurality of seats to specified target locations. For example, the integrated controller 340 may receive the current locations of the first seat and the second seat from the first controller 341 and the second controller 342. The integrated controller 340 may then identify target locations corresponding to the specified input and predict a possibility of an interference that will occur between the seats based on the current location and the target location.

In an example, when the setting of the operation sequences is completed based on an interference possibility prediction result, the integrated controller 340 may transmit an operation signal based on the set operation sequences to the first controller 341 and/or the second controller 342.

Referring to FIG. 3B, according to an embodiment, a first system 301 (or the first driving device), a second system 302 (or the second driving device), and the integrated controller 340 may transmit and receive electrical signals to and from each other.

In an example, the first system 301 may include a first seat 391. The first system 301 may include at least one of at least one motor (e.g., a first slide motor 321, a first reclining motor 322, a first tilting motor 323, or a first leg rest motor 324) for controlling a location of the first seat 391, a first input device 311, the first controller 341, or any combination thereof.

The second system 302 may include a second seat 392. The second system 302 includes at least one motor (e.g., a second slide motor 331, a second reclining motor 332, a second tilting motor 333, or a second leg rest motor 334) for controlling the location of the second seat 392, a second input device 312, the second controller 342, or any combination thereof.

Figure 4:
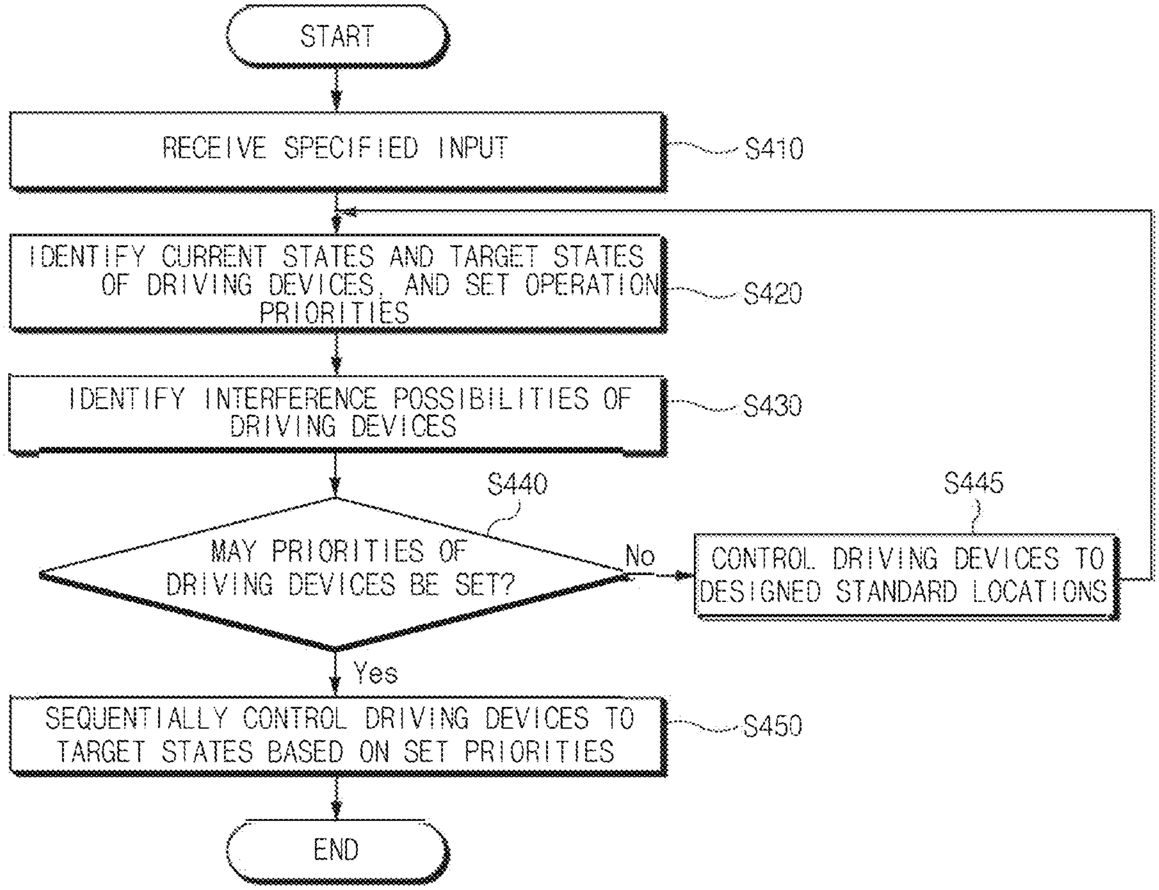
FIG. 4 is a flowchart of a seat control method, according to an embodiment of the present disclosure.

FIG. 4 is a flowchart of a seat control method, according to an embodiment of the present disclosure.

According to an embodiment, the seat control apparatus (e.g., the seat control apparatus 100 of FIG. 1) may perform operations of the method of FIG. 4. For example, at least some of the components included in the seat control apparatus (e.g., the input device 110, the driving device 120, the memory 130, the controller 140, and the output device 150 of FIG. 1) may be configured to perform the operations of the method of FIG. 4.

In embodiments, operations S410-S450 may be performed sequentially. However, the operations S410-S450 are not necessarily performed sequentially, in some embodiments. For example, the sequence of the operations may be changed and/or at least two operations may be performed in parallel. It is noted that contents that correspond to or overlap the contents described above may have been briefly described below in connection with FIG. 4 or may have been omitted from the description below in connection with FIG. 4.

In an operation S410, the seat control apparatus may receive a specified input.

For example, the seat control apparatus may receive a specified input regarding a seat location control from the user via the input device.

In an operation S420, the seat control apparatus may identify current states and target states of the driving devices, and may set the operation priorities.

For example, the priorities set in the operation S420 may be set to higher as required control degrees of the driving devices becomes higher.

In an operation S430, the seat control apparatus may identify a possibility of an interference between the driving devices.

In an operation S440, the seat control apparatus may identify whether the priorities of the driving devices may be set.

For example, the priorities identified in the operation S440 may be operation sequences. In other words, the priorities identified in the operation S440 may be different from the priorities set in the operation S420. For example, the priorities set in the operation S420 may be initial priorities set based on the required control degrees, and the priorities set in the operation S440 may be newly set operation sequences in consideration of an interference possibility with the initial priorities for control of the actual driving devices.

If the priorities may be set (operation Yes in the operation S440), the seat control apparatus may perform an operation S450.

On the other hand, if the priorities cannot be set (No in the operation S440), the seat control apparatus may perform an operation S445.

In the operation S445, the seat control apparatus may control the driving devices at specified standard locations.

For example, because it is identified that the operation sequences are not set based on the operation S440, the seat control apparatus may move the driving devices to pre-defined standard locations and may repeatedly perform the predicted operations based on the updated current locations and target locations.

For example, the seat control apparatus may first move, among the plurality of driving devices, only a specific driving device that is determined according to a specified standard to a standard location. The seat control apparatus may then repeatedly perform a predictive operation. Further, when the operation sequences are not set again, may repeatedly perform an operation of moving the driving devices other than the specific driving device, to the standard locations.

For example, unlike the illustration, the seat control apparatus may stop controlling the driving devices and may provide notification information regarding an inability to control the seat to the user through the output device.

In the operation S450, the seat control apparatus may sequentially control the driving devices to the target states based on the set priorities.

Figure 5:
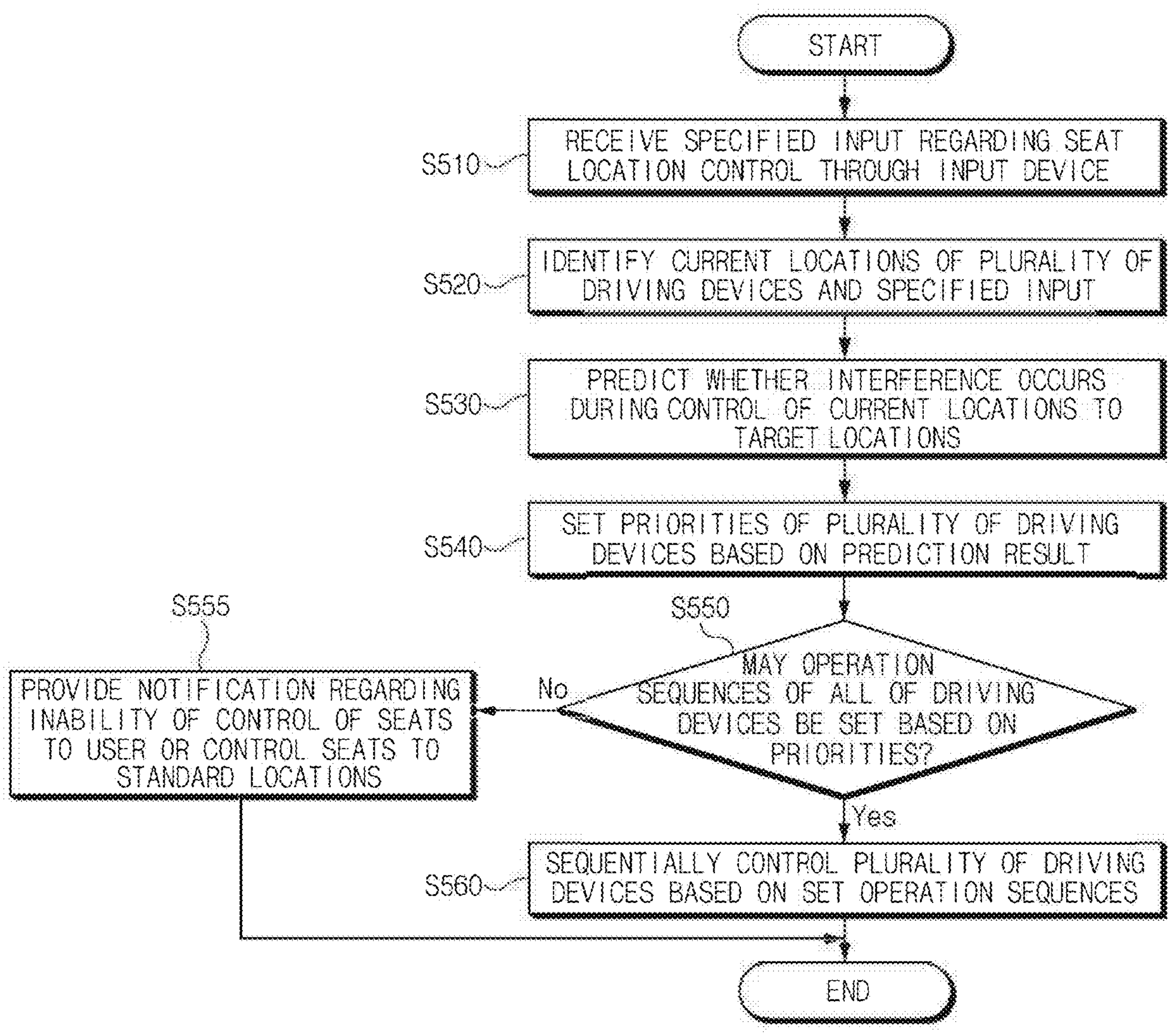
FIG. 5 is a flowchart of a seat control method, according to another embodiment of the present disclosure.

FIG. 5 is a flowchart of a seat control method, according to another embodiment of the present disclosure.

According to an embodiment, the seat control apparatus (e.g., the seat control apparatus 100 of FIG. 1) may perform the operations of the method of FIG. 5. For example, at least some of the components that are included in the seat control apparatus (e.g., the input device 110, the driving device 120, the memory 130, the controller 140, and the output device 150 of FIG. 1) may be configured to perform the operations of the method of FIG. 5.

In embodiments, operations S510-S560 illustrated in FIG. 5 may be performed sequentially. However, the operations S510-560 are not necessarily performed sequentially as illustrated in FIG. 5, in some embodiments. For example, the sequences of the operation may be changed and/or at least two operations may be performed in parallel. It is noted that contents that correspond to or overlap the contents described above may be briefly described below in connection with FIG. 5 or may be omitted from the description of FIG. 5.

In an operation S510, the seat control apparatus may receive a specified input regarding a seat location control through the input device.

In an operation S520, the current locations and the target locations corresponding to the specified inputs of the plurality of driving devices may be identified.

In an operation S530, the seat control apparatus may predict whether there will be an interference (or an interference possibility) while controlling the driving devices from the current locations to the target locations.

In an operation S540, the priorities for the plurality of driving devices may be set based on the prediction result.

For example, the seat control apparatus may set the priorities based on the required control degrees of the plurality of driving devices.

In an operation S550, the seat control apparatus may identify whether it is possible to set operation sequences for all of the driving devices based on the priorities.

When the operation sequences may be set (Yest in the operation S550), the seat control apparatus may perform an operation S560.

On the other hand, when it is impossible to set the operation sequences (No in the operation S550), the seat control apparatus may perform an operation S555.

In the operation S555, the seat control apparatus may provide the user with a notification regarding the inability to control the seat or may control the seat to a predefined standard location.

In the operation S560, the seat control apparatus may sequentially control the plurality of driving devices based on the set operation sequences.

Figure 6:
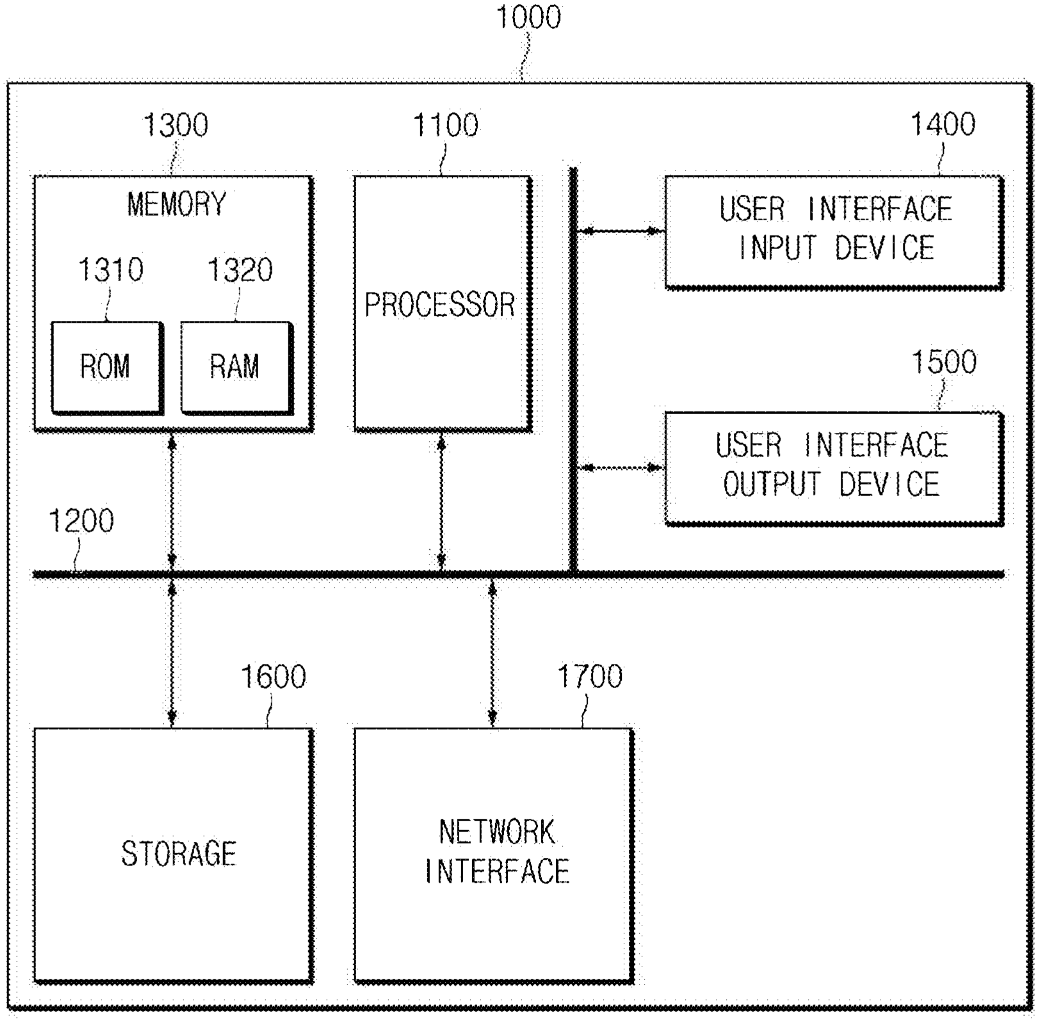
FIG. 6 illustrates a computing system for a seat control apparatus or a seat control method, according to embodiments of the present disclosure.

FIG. 6 illustrates a computing system for a seat control apparatus or a seat control method, according to an embodiment of the present disclosure.

Referring to FIG. 6, a computing system 1000 that may implement the seat control method may include at least one processor 1100, a memory 1300, a user interface input device 1400, a user interface output device 1500, a storage 1600, and a network interface 1700, which are connected through a bus 1200.

The processor 1100 may be a central processing unit (CPU), or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm according to embodiments of the present disclosure may be implemented directly by hardware executed by the processor 1100, a software module, or a combination thereof. The software module may reside in a storage medium (the memory 1300 and/or the storage 1600), such as a RAM, a flash memory, a ROM, an EPROM, an EEPROM, a register, a hard disk, a solid state drive (SSD), a detachable disk, or a CD-ROM.

The storage medium may be coupled to the processor 1100. The processor 1100 may read information from the storage medium and may write information to the storage medium. In another example, the storage medium may be integrated with the processor 1100. The processor and the storage medium may reside in an application specific integrated circuit (ASIC). The ASIC may reside in a user terminal. In another example, the processor and the storage medium may reside in the user terminal as an individual component.

The effects of the seat control apparatus and the seat control method according to embodiments of the present disclosure are follows.

According to embodiments of the present disclosure, when a specified input regarding control of seats in a vehicle is received from a user, an interference possibility of the seats may be predicted, and operation sequences by which no interference will occur may be determined based on the prediction result. Driving devices for control of the seats may then be sequentially controlled to move the seats based on the determined operation sequences.

Embodiments of the present disclosure provide a seat control apparatus and method that may identify the current locations (or the current states) and the target locations (or the target states) of the driving devices. The seat control apparatus and method may then first determine an interference possibility of a driving device of which a movement amount (or a control degree), by which the driving device has to be moved from the current location to the target location, is largest.

Embodiments of the present disclosure provide a seat control apparatus and method that provide an alarm regarding an inability of control to the user and/or moves the seats to standard locations when it is predicted that an interference of the seats will occur according to any possible operation sequences.

Embodiments of the present disclosure provide an experience of an interior of a vehicle that enhances product value, convenience, and/or safety to the user, by moving the seats (or the driving devices) to the standard locations, and in turn, determining an interference possibility, and determining the operation sequences to move the seats (or the driving devices) to specified states.

In addition, various effects directly or indirectly recognized through the specification may be provided.

The above description is an illustrative description of the technical spirit of the present disclosure. The present disclosure may be variously modified and altered by a person having ordinary skill in the art to which the present disclosure pertains, without departing from the essential characteristics of the present disclosure.

Therefore, the embodiments of the present disclosure are provided to explain the spirit and scope of the present disclosure, but not to limit them. The spirit and scope of the present disclosure is not limited by the described embodiments. The scope of the present disclosure should be construed on the basis of the accompanying claims, and all the technical ideas within the scope equivalent to the claims should be included in the scope of the present disclosure.

What is claimed is:

1. A seat control apparatus comprising:
- an input device;
- a plurality of driving devices;
- a memory configured to store one or more instructions; and
- a controller operatively connected to the input device, the plurality of driving devices, and the memory,
- wherein the instructions, when executed by the controller, cause the seat control apparatus to
  - identify current locations of the plurality of driving devices and target locations corresponding to a specified input regarding a location control of a seat in response to receiving the specified input through the input device,
  - predict that an interference will occur while the plurality of driving devices are controlled from the current locations to the target locations,
  - set operation sequences of the plurality of driving devices based on i) a result of the prediction that the interference will occur while the plurality of driving devices are controlled from the current locations to the target locations and ii) priorities of the plurality of driving devices,
  - sequentially control the plurality of driving devices based on the operation sequences,
  - determine an interference possibility of a second driving device corresponding to a next priority to a first driving device in response to predicting that the first driving device will interfere with another driving device, among the plurality of driving devices, while the first driving device is moved from a first current location to a first target location, and
  - set the operation sequences to control the second driving device to a first priority in response to predicting that the second driving device will not interfere with any other driving device, among the plurality of driving devices, while the second driving device is moved from a second current location to a second target location.

2. The seat control apparatus of claim 1, wherein the instructions, when executed by the controller, further cause the seat control apparatus to:
- set a higher priority to, among the plurality of driving devices, a driving device of which a control degree required for moving the seat from a current location to a target location is higher.

3. The seat control apparatus of claim 1, wherein the instructions, when executed by the controller, cause the seat control apparatus to:
- set the operation sequences to control a first driving device to a first priority in response to predicting that the first driving device will not interfere with any other driving device, among the plurality of driving devices, while the first driving device is moved from a first current location to a first target location; and
- determine an interference possibility of a third driving device corresponding to a next priority to a second driving device in response to predicting that the second driving device will interfere with another driving device, among the plurality of driving devices, while the second driving device is moved from a second current location to a second target location.

4. The seat control apparatus of claim 3, wherein the instructions, when executed by the controller, cause the seat control apparatus to:
- set the operation sequences to control the third driving device to a second priority in response to predicting that the third driving device will not interfere with any other driving device, among the plurality of driving devices, while the third driving device is moved from a third current location to a third target location;
- set the operation sequences to control the second driving device to a third priority in response to predicting that the second driving device will not interfere with any other driving device, among the plurality of driving devices, while the second driving device is moved from the second current location to the second target location after the first driving device and the third driving device are moved, respectively, to the first target location and the third target location; and
- sequentially move the first driving device, the third driving device, and the second driving device to, respectively, the first target location, the third target location, and the second target location, based on the operation sequences.

5. The seat control apparatus of claim 1, wherein the instructions, when executed by the controller, cause the seat control apparatus to:
- predict that an interference will occur while the plurality of driving devices are controlled from updated current locations to the target locations after the plurality of driving devices are moved to predefined standard locations when the operation sequences are not set; and
- sequentially control the plurality of driving devices in operation sequences determined based on i) a result of the prediction that the interference will occur while the plurality of driving devices are controlled from updated current locations to the target locations and ii) the priorities.

6. The seat control apparatus of claim 5, wherein the instructions, when executed by the controller, cause the seat control apparatus to:

predict that an interference will occur while a first driving device is controlled from a predefined first standard location to a first target location after the first driving device is moved to the predefined first standard location when the operation sequences are not set; and set the operation sequences based on i) a result of the prediction that the interference will occur while the first driving device is controlled from the predefined first standard location to the first target location and ii) the priorities.

7. The seat control apparatus of claim 5, wherein the instructions, when executed by the controller, cause the seat control apparatus to:

move a driving device, among the plurality of driving devices, corresponding to a seat disposed on a front side with respect to a direction in which a host vehicle faces to the predefined first standard location first when the operation sequences are not set.

8. The seat control apparatus of claim 1, further comprising:

an output device, wherein the instructions, when executed by the controller, cause the seat control apparatus to stop operations of the plurality of driving devices when the operation sequences are not set, and provide notification information including at least one of i) interference possibilities of the plurality of driving devices, ii) control disable state guides, or iii) guides regarding the current locations and the target locations to a user through the output device.

9. The seat control apparatus of claim 1, wherein the plurality of driving devices includes a first driving device corresponding to a first seat among a plurality of seats disposed in a host vehicle, and wherein the first driving device includes at least one of a tilting motor configured to adjust a tilting angle of the first seat, a reclining motor configured to adjust a backrest angle of the first seat, a leg rest motor configured to adjust a leg rest angle of the first seat, or a slide motor configured to adjust a slide location of the first seat.

10. A seat control method, comprising:

identifying, by a controller, current locations of a plurality of driving devices and target locations corresponding to a specified input regarding a location control of a seat in response to receiving the specified input through an input device;

predicting, by the controller, that an interference will occur while the plurality of driving devices are controlled from the current locations to the target locations;

setting, by the controller, operation sequences of the plurality of driving devices based on i) a result of the prediction that an interference will occur while the plurality of driving devices are controlled from the current locations to the target locations and ii) priorities of the plurality of driving devices;

sequentially controlling, by the controller, the plurality of driving devices based on the operation sequences;

determining, by the controller, an interference possibility of a second driving device corresponding to a next priority to a first driving device in response to predicting that the first driving device will interfere with another driving device, among the plurality of driving devices, while the first driving device is moved from a first current location to a first target location; and setting, by the controller, the operation sequences to control the second driving device to a first priority in response to predicting that the second driving device will not interfere with any other driving device, among the plurality of driving devices, while the second driving device is moved from a second current location to a second target location.

11. The seat control method of claim 10, further comprising:

setting, by the controller, a higher priority to, a driving device, among the plurality of driving devices, of which a control degree required for moving the driving device from a current location to a target location is higher.

12. The seat control method of claim 10, further comprising:

setting, by the controller, the operation sequences to control a first driving device to a first priority in response to predicting that the first driving device will not interfere with any other driving device, among the plurality of driving devices, while the first driving device is moved from a first current location to a first target location; and determining, by the controller, an interference possibility of a third driving device corresponding to a next priority to a second driving device in response to predicting that the second driving device will interfere with another driving device, among the plurality of driving devices, while the second driving device is moved from a second current location to a second target location.

13. The seat control method of claim 12, further comprising:

setting, by the controller, the operation sequences to control the third driving device to a second priority in response to predicting that the third driving device will not interfere with any other driving device, among the plurality of driving devices, while the third driving device is moved from a third current location to a third target location;

setting, by the controller, the operation sequences to control the second driving device to a third priority in response to predicting that the second driving device will not interfere with any other driving device, among the plurality of driving devices, while the second driving device is moved from the second current location to the second target location after the first driving device and the third driving device are moved, respectively, to the first target location and the third target location; and sequentially moving the first driving device, the third driving device, and the second driving device to, respectively, the first target location, the third target location, and the second target location, based on the operation sequences.

14. The seat control method of claim 10, further comprising:

predicting, by the controller, that an interference will occur while the plurality of driving devices are controlled from updated current locations to the target locations after the plurality of driving devices are moved to predefined standard locations when the operation sequences are not set; and sequentially controlling, by the controller, the plurality of driving devices in operation sequences determined based on i) a result of the prediction that an interference will occur while the plurality of driving devices are controlled from updated current locations to the target locations and ii) the priorities.

15. The seat control method of claim 14, further comprising:

predicting, by the controller, that an interference will occur while a first driving device, among the plurality of driving devices, is controlled from a predefined first standard location to a first target location after the first driving device is moved to the predefined first standard location when the operation sequences are not set; and setting, by the controller, the operation sequences based on i) a result of the prediction of that the interference will occur while the first driving device is controlled from the predefined first standard location to the first target location and ii) the priorities.

16. The seat control method of claim 14, further comprising:

moving, by the controller, a driving device, among the plurality of driving devices, corresponding to a seat disposed on a front side with respect to a direction in which a host vehicle faces to the predefined first standard location first when the operation sequences are not set.

17. The seat control method of claim 10, further comprising:

stopping, by the controller, operations of the plurality of driving devices when the operation sequences are not set; and providing, by the controller, notification information including at least one of i) interference possibilities, ii) control disable state guides, or iii) guides regarding the current locations and the target locations to a user through an output device.

18. The seat control method of claim 10, wherein the plurality of driving devices include a first driving device corresponding to a first seat among a plurality of seats disposed in a host vehicle, and wherein the first driving device includes at least one of:

a tilting motor configured to adjust a tilting angle of the first seat, a reclining motor configured to adjust a backrest angle of the first seat, a leg rest motor configured to adjust a leg rest angle of the first seat, or a slide motor configured to adjust a slide location of the first seat.

* * * * *